US012311325B2

(12) United States Patent
Shi et al.

(10) Patent No.: US 12,311,325 B2
(45) Date of Patent: May 27, 2025

(54) IMPELLER ASSEMBLY FOR DISPERSING SOLID IN LIQUID UTILIZING CURVED BAFFLE PLATE AND SOLID-LIQUID MIXING DEVICE USING IMPELLER ASSEMBLY

(71) Applicant: Shangshui Smartech Ltd., Guangdong (CN)

(72) Inventors: Qiao Shi, Shenzhen (CN); Shujuan Bai, Shenzhen (CN); Tongzhu Li, Shenzhen (CN); Quanxun Ou, Shenzhen (CN)

(73) Assignee: Shangshui Smartech Ltd., Guangdong (CN)

(*) Notice: Subject to any disclaimer, the term of this patent is extended or adjusted under 35 U.S.C. 154(b) by 605 days.

(21) Appl. No.: 17/765,301

(22) PCT Filed: Jan. 12, 2021

(86) PCT No.: PCT/CN2021/071151
§ 371 (c)(1),
(2) Date: Mar. 30, 2022

(87) PCT Pub. No.: WO2021/159900
PCT Pub. Date: Aug. 19, 2021

(65) Prior Publication Data

US 2022/0379274 A1 Dec. 1, 2022

(30) Foreign Application Priority Data

Feb. 10, 2020 (CN) ......................... 202010085377.7

(51) Int. Cl.
*B01F 27/113* (2022.01)
*B01F 23/53* (2022.01)
(Continued)

(52) U.S. Cl.
CPC ............ *B01F 27/113* (2022.01); *B01F 23/53* (2022.01); *B01F 27/117* (2022.01);
(Continued)

(58) Field of Classification Search
CPC .... B01F 23/56; B01F 27/812; B01F 25/4511; B01F 27/27; B01F 27/8111; B01F 33/862;
(Continued)

(56) References Cited

U.S. PATENT DOCUMENTS

2011/0075507 A1 3/2011 Wootan et al.
2014/0318230 A1 10/2014 Pellegrino et al.
(Continued)

FOREIGN PATENT DOCUMENTS

CN 103041729 A 4/2013
CN 203437066 U 2/2014
(Continued)

OTHER PUBLICATIONS

International Search Report and Written Opinion dated Mar. 31, 2021, for International Application PCT/CN2021/071151.
(Continued)

*Primary Examiner* — Charles Cooley
(74) *Attorney, Agent, or Firm* — Young Basile Hanlon & MacFarlane, P.C.

(57) ABSTRACT

An impeller assembly for a solid-liquid mixing device, which includes an impeller body, multiple mixing blades which are evenly distributed on the inner side of the impeller body and extended outwards from the shaft of the impeller body, and at least two baffle plates being disposed on the outer side of the impeller body along a radial direction thereof outwards and disposed in the circumferential direction of the impeller body. At least one pair of adjacent two baffle plates satisfies following conditions: curves projected
(Continued)

by two opposite surfaces of each of adjacent baffle plates on a cross section of the impeller at any height are smooth curves, and at least one of the curves is not fully included in a circle with the center of the shaft as its center.

7 Claims, 12 Drawing Sheets

(51) Int. Cl.

| | |
|---|---|
| ***B01F 27/117*** | (2022.01) |
| ***B01F 27/271*** | (2022.01) |
| ***B01F 27/272*** | (2022.01) |
| ***B01F 27/81*** | (2022.01) |

(52) U.S. Cl.

CPC .......... *B01F 27/271* (2022.01); *B01F 27/272* (2022.01); *B01F 27/8111* (2022.01); *B01F 27/812* (2022.01)

(58) Field of Classification Search

CPC ........ B01F 27/40; B01F 27/41; B01F 27/411; B01F 27/412; B01F 25/45; B01F 25/4523; B01F 27/2711; B01F 27/84; B01F 27/91; B01F 27/911; B01F 27/92; B01F 27/9213; B01F 27/9214; B01F 2215/0422; B01F 2215/0431; B01F 23/41; B01F 27/1921; B01F 25/105; B01F 25/60; B01F 27/1125; B01F 27/114; B01F 27/1145; B01F 27/70; B01F 27/72; B01F 27/90; B01F 27/113; B01F 23/53; B01F 27/117; B01F 27/271; B01F 27/272; B01F 27/11; B01D 17/0217; B01D 19/0052

USPC ........................................ 366/302, 304, 305

See application file for complete search history.

(56) References Cited

U.S. PATENT DOCUMENTS

| | | | | |
|---|---|---|---|---|
| 2017/0016373 | A1 | 1/2017 | Middleton, Jr. | |
| 2022/0379274 | A1* | 12/2022 | Shi | B01F 27/272 |

FOREIGN PATENT DOCUMENTS

| | | | | |
|---|---|---|---|---|
| CN | 106994307 | A | 8/2017 | |
| CN | 108671789 | A | 10/2018 | |
| CN | 109499404 | A | 3/2019 | |
| CN | 109600995 | A | 4/2019 | |
| CN | 110215857 | A | 9/2019 | |
| CN | 110394082 | A * | 11/2019 | B01F 23/53 |
| CN | 111249941 | A * | 6/2020 | B01F 23/53 |
| EP | 4005661 | A1 * | 6/2022 | B01F 23/53 |
| JP | 2006-036857 | A | 2/2006 | |
| WO | 2005/014153 | A1 | 2/2005 | |
| WO | 2019/065986 | A1 | 4/2019 | |

OTHER PUBLICATIONS

Chinese First Office Action dated Jan. 29, 2021, for Chinese Application 202010085377.7.

Chinese Second Office Action dated Apr. 19, 2021, for Chinese Application 202010085377.7.

Japanese Notice of Reasons for Refusal and English translation for JP Application No. 2022-515627 dated Feb. 7, 2023.

Korean First Office Action and English translation for KR Application No. 10-2022-7013974 dated Sep. 19, 2023.

* cited by examiner

-Prior Art-

-Prior Art-

IMPELLER ASSEMBLY FOR DISPERSING SOLID IN LIQUID UTILIZING CURVED BAFFLE PLATE AND SOLID-LIQUID MIXING DEVICE USING IMPELLER ASSEMBLY

CROSS-REFERENCE TO RELATED APPLICATIONS

This application is a national stage application of International Patent Application No. PCT/CN2021/071151, filed on Jan. 12, 2021, which claims the priority of Chinese Patent Application No. 202010085377.7 entitled "Impeller Assembly for Dispersing Solid in Liquid and Solid-liquid Mixing Device Using Impeller Assembly" filed with the Chinese Patent Office on Feb. 10, 2020, which is incorporated herein by reference in its entirety.

TECHNICAL FIELD

The present disclosure relates to an impeller assembly for a solid-liquid mixing device, in particular to an impeller assembly for a device for producing a high-viscosity or high-concentration suspension by mixing superfine solid powder and liquid, and a solid-liquid mixing device using the impeller assembly.

BACKGROUND

In order to mix and disperse superfine powder in a small amount of liquid to obtain a high-concentration suspension, the process can be divided into three stages including scattering, wetting and dispersion. In the first stage, through stirring of structures such as blades, large clumps of powder are scattered into a relatively fine powder. Next, the powdery solid is in contact with liquid, and the liquid fully wetting the surfaces of the solid particles. Finally, in the dispersion stage, a suspension formed in the wetting stage is subjected to dispersion treatment, so that the distribution consistency of the powder particles in the suspension meets the production requirement. At this stage, the scattering of agglomerates and the dispersion of particle agglomerates that may be present in the suspension are completed by using strong shear force mainly. With the development of the powder technology and the nanotechnology, the particle size of powder becomes smaller, the specific surface area is increased, and a large amount of gas is adsorbed on the surface of the powder. So, sufficient wetting of powder particles by liquid becomes difficult, the powder particles are easily distributed unevenly and even agglomerated in the liquid, ultrafine powder particles are easily agglomerated, and the dispersion of the aggregates also becomes difficult. In order to strengthen the dispersion effect, blades of the impeller body are generally improved, for example, the number of the blades is increased, the area of the blades is increased, and special blade shapes are adopted. In order to obtain a better dispersion effect, a module with a stator and a rotor, which rotates at a relatively high speed and is small in gaps, needs to be adopted.

There are many types of modules with the stators and the rotors, and a gap between a stator and a rotor can be in a fixed value, or can be changed due to the existence of grooves or protrusions. If the gap between the stator and the rotor is in a fixed value, the gap needs to be designed to be very small in order to obtain very high shear strength, so that the volume of a dispersion area becomes very small. Under the condition that the flow is not changed, the retention time of suspension in the dispersion area becomes very short, and the dispersion effect is not good enough. Therefore, the gap can only be designed slightly larger, with a balance between shear strength and retention time, which limits the improvement in dispersion effect.

Chinese patent CN110394082A discloses an impeller assembly which is improved aiming at the problems existing in operation of existing devices. The impeller assembly adopts a structure of double baffle plates. Staggered small holes are formed in the innermost baffle plate. Knurls or grooves are formed in this innermost baffle plate. Although this structure has a good dispersion effect, there is still a problem that it is difficult to achieve small gaps and sufficient residence time simultaneously.

If multiple grooves or protrusions are formed in the stator and the rotor, a volume of the large dispersion area can be obtained while a small gap is kept, so that the retention time is theoretically prolonged, and the dispersion effect is improved. However, through a series of studies such as simulation calculation, the inventor of the present disclosure discovers that the square groove structure (FIG. 1*a*) adopted in the prior art cannot effectively increase the dispersion volume due to the following reasons. As shown in FIG. 1B, the relative flow velocity of a fluid in the grooves is relatively slow, vortexes occur, and the fluid in the area is subjected to relatively weak shear action and longer retention time. Furthermore, the volume of this area is not an effective dispersion volume, and even "dead zones" exist, and thus uneven dispersion may be possibly caused. In addition, vortexes can also cause energy loss, so that the dispersion efficiency is reduced.

Therefore, although the module with the stator and the rotor formed by multiple baffle plates is a good solution in the field of solid (powder) and liquid mixing, especially in the field of a high-viscosity and high-concentration suspension formed by mixing liquid and ultrafine powder, small gaps and enough retention time are difficult to achieve simultaneously in the prior art, and a certain limitation exists on the dispersion effect. Some schemes that grooves are formed in the baffle plate are not helpful for improving the dispersion effect, whereas uneven dispersion and reduction of the dispersion efficiency are possibly caused. The technical problem to be solved by the present disclosure is to improve the structure of the module with the stator and the rotor, simultaneously achieve small gaps and enough retention time, generate uniform strong shear effect on particles in the suspension, and efficiently disperse particle agglomerates in the particles.

SUMMARY

In view of this, the embodiments aim to provide an impeller assembly capable of dispersing agglomerates in a suspension more quickly to obtain a uniformly dispersed suspension, especially when the device is configured for preparing a high-viscosity or high-concentration suspension generated by mixing ultrafine powder and liquid.

The present disclosure designs an impeller assembly for a solid-liquid mixing device, which includes an impeller body, multiple mixing blades which are evenly distributed on an inner side of the impeller body and extended outwards from the shaft of the impeller body, and at least two baffle plates being disposed on an outer side of the impeller body along a radial direction of the impeller body outwards and disposed in a circumferential direction of the impeller body. In every adjacent two baffle plates, one is fixedly connected to a cavity of the mixing device, and the other is fixedly connected to the impeller body. And at least one pair of adjacent two baffle plates satisfies the following conditions: curves projected by two opposite surfaces of each of the adjacent baffle plates on a cross section of the impeller at any height are smooth curves, and at least one of the curves is not fully included in a circle with a center of the shaft as its center.

In the scheme, when a pair of adjacent baffle plates arranged on the impeller body rotates, the gap between the baffle plates is changed (FIG. 2*a*), so that a larger dispersion volume can be kept while the minimum gap is small. And due to the fact that the speed direction of a fluid can be well changed along a smooth curved surface, laminar flow motion and uniform velocity gradient can still be maintained when the width of the flow passage is changed, and vortexes and "dead zones" do not exist (FIG. 2*b*). Therefore, the newly designed structure with the stator and the rotor can well achieve small gaps and enough retention time simultaneously, and the dispersion effect is improved. Moreover, the absence of vortexes also guarantees high dispersion efficiency.

Not only that, when the gaps become small smoothly, the cavitation can be effectively caused in the suspension, a lot of microbubbles are generated (referring to Chinese patent CN110235528A), so that the dispersion of particle agglomerates is facilitated.

In some embodiments, one of the opposite surfaces of at least two adjacent baffle plates is provided with a corrugated structure which fluctuate periodically along the circumferential direction of the impeller body. On one hand, a corrugated fluctuant surface can guide a direction of the fluid to be changed continuously, whereas a relatively uniform velocity gradient is still maintained, so that a uniform strong shear force is generated on the suspension. And, the corrugated structure effectively increases an average gap between the baffle plates, so that the dispersion volume is increased, and the retention time is prolonged. On the other hand, a flow passage with continuously changing width is formed in the corrugated fluctuant surface. So, when the width of the flow passage becomes smaller continuously, the flow speed of the fluid is continuously increased, and the static pressure of the fluid is continuously decreased. When the static pressure is instantly reduced to be low enough, cavitation is caused, a lot of microbubbles are generated, and strong impact is caused to particle agglomerates in the suspension, so that the dispersion effect is improved.

In some embodiments, the impeller body can be designed to be in a truncated cone shape, so that mixing of powder and liquid can be carried out on an upper portion of a truncated cone-shaped body. After that, the suspension formed by the powder and the liquid is continuously accelerated by the blades in a downward flowing process, and finally reaches a dispersion area to be subjected to strong shear dispersion, so that wetting and dispersion of the powder are facilitated.

Furthermore, in order to guarantee high shear strength, a size of a minimum gap between the two adjacent baffle plates is 1-5 mm. In order to ensure that the suspension can smoothly pass through the multiple baffle plates, the gaps between top ends of the baffle plates and a surface of the cavity or the impeller body opposite to the baffle plates are 1-10 mm. In addition, in order to improve the flow rate of the suspension, through holes or through grooves may be formed in surfaces of each of the baffle plates, and the diameter of each of the through holes or the width of each of the through grooves is 1-5 mm.

In some embodiments, when the height of the through grooves are close to or even reach the height of the whole baffle plate, a cross section of the baffle plate is of a comb-shaped structure formed by arranging a shape surrounded by multiple circles, ellipses or other closed smooth curves along the circumferential direction of the impeller body at predetermined intervals. The suspension passes through the baffle plates more smoothly, and the flow rate is improved. This structure can also guide the fluid to change the speed direction of the fluid uniformly without forming vortexes or "dead zones", so that a good dispersion effect is still maintained.

Furthermore, in order to discharge the suspension after passing through the multiple baffle plates, the impeller assembly further includes multiple discharging blades disposed on an outer side of an outermost one of baffle plates substantially along the radial direction of the impeller body, and the multiple discharging blades are fixedly connected with the impeller body and rotate synchronously along with the impeller body.

The solid-liquid device of the embodiments has the following beneficial effects.

1. The two adjacent baffle plates which move relatively are designed into structures with the following characteristics: the curves corresponding to two opposite surfaces of the baffle plate on a cross section at any height are smooth curves, and at least one of the curves is not fully included in a circle with the center of the shaft as its center. Therefore, when the two baffle plates move relatively, the gap between the two baffle plates changes continuously, a minimum gap can be kept to be small to maintain high shear strength, the volume of the dispersion area can be remarkably increased to guarantee enough retention time, and thus a good dispersion effect is obtained.

2. The surfaces of the baffle plate are designed into a smooth curved surfaces, so that the fluid can be guided to uniformly change the speed direction of the fluid, laminar flow movement and uniform speed gradient can still be kept when the width of the flow passage is changed, vortexes and "dead zones" do not exist, and good dispersion effect and dispersion efficiency are guaranteed.

3. When the gap between the two adjacent baffle plates becomes smaller smoothly, the speed of the suspension in the flow passage continues to increase, so as to cause the static pressure to continue to reduce. When the static pressure is instantly reduced to be low enough, cavitation is caused, multiple microbubbles are generated, and strong impact is caused to particle agglomerates in the suspension, so that the dispersion effect is improved.

LIST OF THE REFERENCE CHARACTERS

10 impeller assembly; 101 impeller body; 102 mixing blade; 103 baffle plate; 1031 corrugated structure; 1032 through groove; 1033 flange; 104 discharging blade; and 105 cavity.

DETAILED DESCRIPTION OF THE EMBODIMENTS

In order to make the objectives, principles, technical solutions and advantages of the present disclosure clearer, the present disclosure will be further described hereinbelow with reference to the attached figures and embodiments thereof.

It should be understood that the specific embodiments described herein are used to explain the present disclosure, but the present disclosure may be implemented otherwise than as described herein, and those skilled in the art may make similar generalization without departing from the connotation of the present disclosure. Therefore, the present disclosure is not to be limited by the specific embodiments disclosed below.

The present disclosure can be applied to various mixing devices equipped with impeller assemblies, and particularly can be applied to the mixing device for solid-liquid mixing. The device of the present disclosure is specifically disposed in a cavity of the mixing device.

Figure 1A:
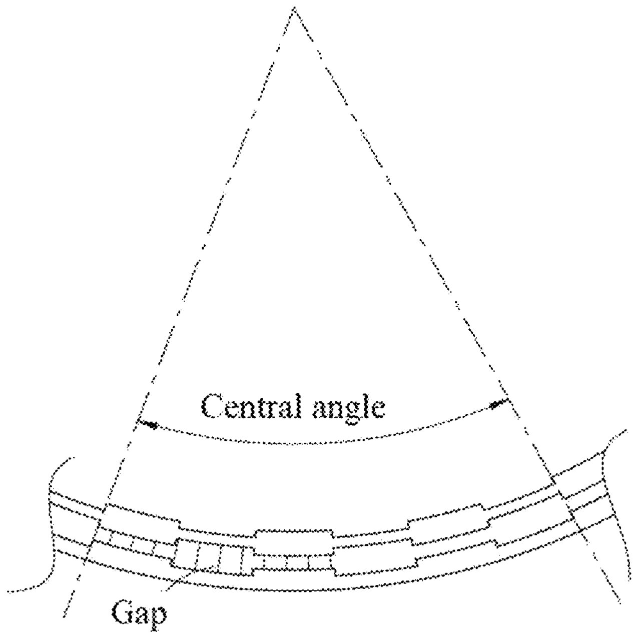
FIG. 1*a* is a schematic diagram of a flow passage of a structure with a stator and a rotor according to the prior art.
Figure 1B:
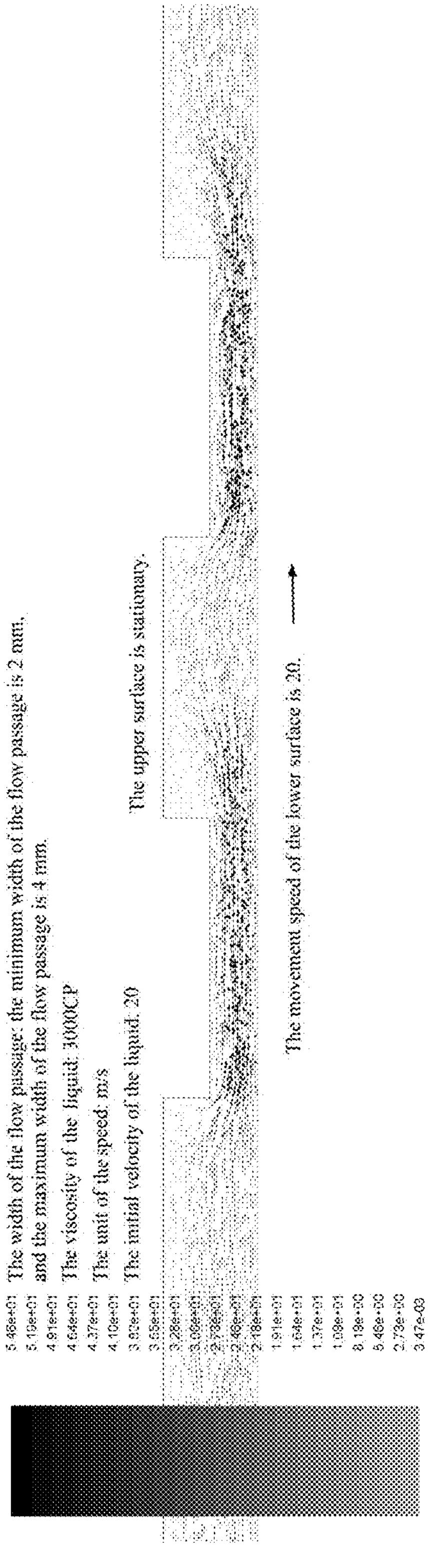
FIG. 1B is a simulation schematic diagram of a flow field of a structure with a stator and a rotor after being simplified according to the prior art.
Figure 2A:
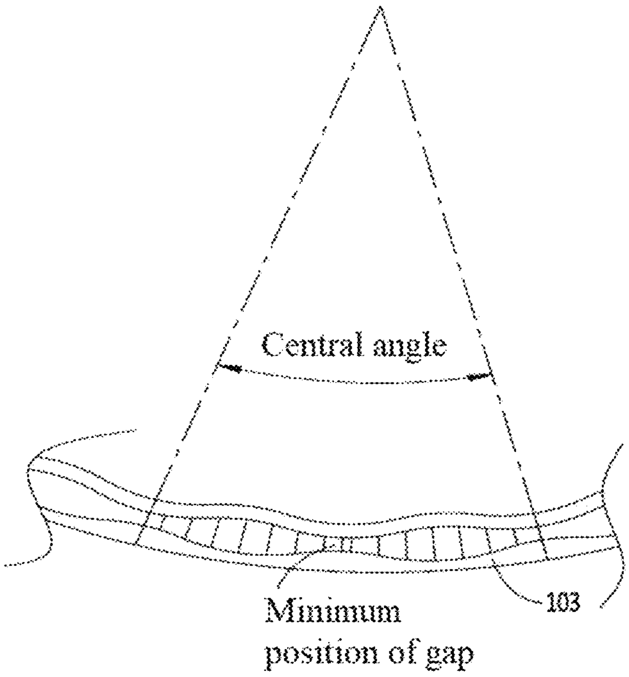
FIG. 2*a* is a schematic diagram of a flow passage of a structure with a stator and a rotor according to the present disclosure.
Figure 2B:
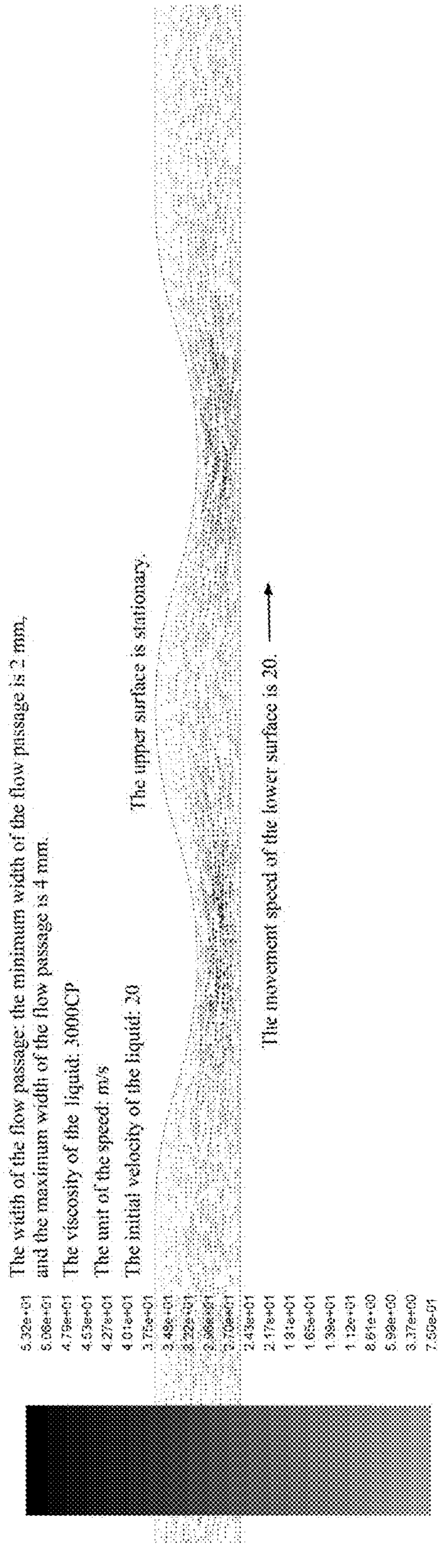
FIG. 2*b* is a simulation schematic diagram of a flow field of a structure with a stator and a rotor after being simplified according to the present disclosure.
Figure 3A:
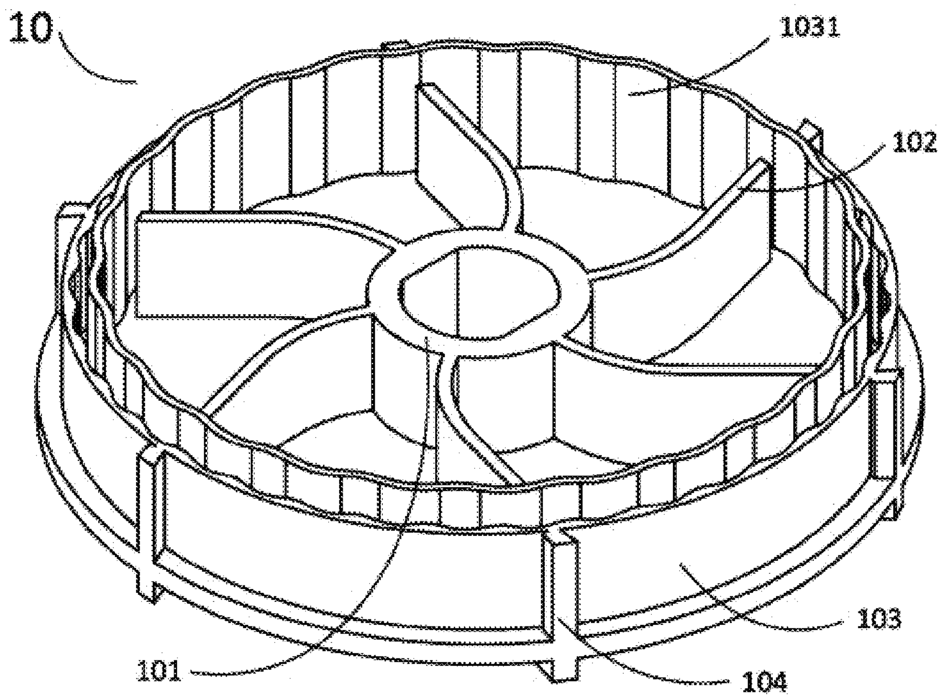
FIG. 3*a* is a schematic diagram of an impeller assembly according to an embodiment of the present disclosure.

FIG. 3*a* is a schematic diagram of an impeller assembly 10 provided by the present disclosure. Referring to FIG. 3*a*, the impeller assembly 10 includes an impeller body 101, multiple mixing blades 102 which are evenly distributed are located on an inner side of the impeller body 101 and extending outwards form a shaft of the impeller body, and inner and outer baffle plates 103 is disposed on an outer side of the impeller body 101 along a radial direction of the impeller body outwards and disposed in a circumferential direction of the impeller body. The inner baffle plate of the two baffle plates 103 is configured to be fixedly connected to a cavity 105 of the mixing device, and inner and outer surfaces of the inner baffle plate are both provided with corrugated structures 1031 which fluctuate periodically along the circumferential direction of the inner baffle plate. The outer baffle plate is fixedly connected to the impeller body 101, and an inner surface of the outer baffle plate is provided with a corrugated structure 1031 which fluctuate periodically along the circumferential direction of the outer baffle plate. It should be understood that for the same baffle plate 103, a side of the baffle plate 103 which is close to the impeller body 101 is the inner surface, and a side of the baffle plate 103 which is away from the impeller body 101 is the outer surface. When the outer baffle plate rotates synchronously along with the impeller body 101, the inner baffle plate and the outer baffle plate move relatively, and curves corresponding to two opposite surfaces of each of the inner and outer baffle plates on a cross section at any height (i.e., a whole height) are continuous corrugated curves. As shown in a simulation schematic diagram of a flow field in FIG. 2*b*, the corrugated surfaces on each baffle plate 103 guide the suspension between the baffle plates 103 to continuously change the speed direction of the suspension when the suspension flows in the gap defined by the baffle plate. However, a relatively uniform velocity gradient is still maintained. So, under the relative movement of the inner and outer baffle plates, on one hand, uniform strong shear force is generated for the suspension in the flow passage, the suspension is repeatedly sheared, rubbed and extruded, the size of the gap defined between the opposite surfaces of the corrugated structures 1031 is continuously and uniformly changed, namely continuously decreased, continuously increased and then continuously decreased periodically changed. In this way, the average gap between the baffle plates 103 is effectively increases, so that the volume of the dispersion area is increased, vortexes and "dead zones" do not exist, the retention time of the suspension in the flow passage is prolonged, and the dispersion effect is more sufficient. On the other hand, a flow passage with continuously changing width is formed in the corrugated fluctuant surface, so that the speed of the suspension is continuously changed when the suspension flows in the flow passage, which makes the static pressure of the fluid change continuously. When the static pressure is instantly reduced to be low enough, cavitation is caused, multiple microbubbles are generated, and strong impact is caused to particle agglomerates in the suspension, so that the dispersion effect is improved.

Figure 3B:
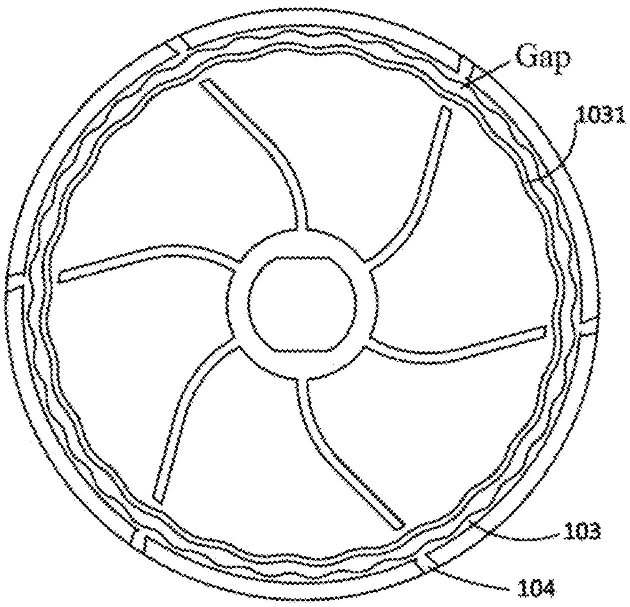
FIG. 3*b* is a cross sectional view of the impeller assembly according to the embodiment of the present disclosure.

It should be understood that in the embodiment of FIG. 3*a* and FIG. 3*b*, the inner baffle plate can also be fixedly connected with the impeller body 101, that is, only one of the inner and outer baffle plates is required to be fixed with the impeller body 101, so that one of the baffle plates is kept movable, and the other is kept static, which is in the protection scope of the present disclosure.

Optionally, in order to ensure that the suspension is subjected to high shear strength in the flow passage formed by the gaps, a minimum size of the gap between the adjacent inner and outer baffle plates is 1-5 mm.

Furthermore, optionally, in order to discharge the suspension after passing through the multiple baffle plates 103, the impeller assembly further includes multiple discharging blades 104 disposed on an outer side of the outermost one of the baffle plates substantially along the radial direction of the impeller body 101. The discharging blades 104 are fixedly connected with the impeller body 101 and rotate synchronously along with the impeller body 101. The mixing blades 102 on the impeller body 101 may extend horizontally a predetermined distance on a lower portion of the impeller body 101, as shown in FIG. 3*a* and FIG. 3*b*. The discharging blades 104 are integrated with portions of the mixing blades 102 which extend horizontally on the lower portion of the impeller body 101. With the fixed connection design, the suspension can be well stirred, guided and accelerated, and the suspension can be thrown out at a higher speed. The design that mixing blades 102 are integrated with the discharging blades 104 can simplify the overall construction of the impeller assembly 10.

It should be noted that the continuous corrugated curves shown in FIG. 3*a* and FIG. 3*b* are only of schematic illustration and should not limit the present disclosure, and that the design that curves corresponding to the two opposite surfaces of any pair baffle plates at any height are smooth curves is within the protection scope of the present disclosure.

Figure 4A:
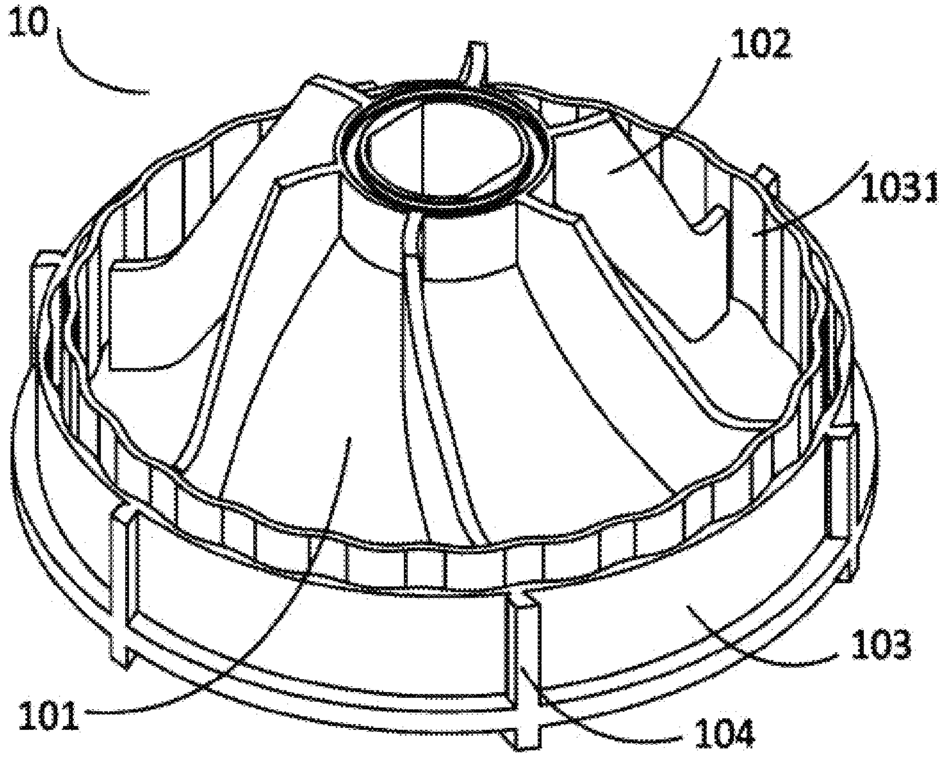
FIG. 4*a* is another schematic diagram of an impeller assembly according to an embodiment of the present disclosure.
Figure 4B:
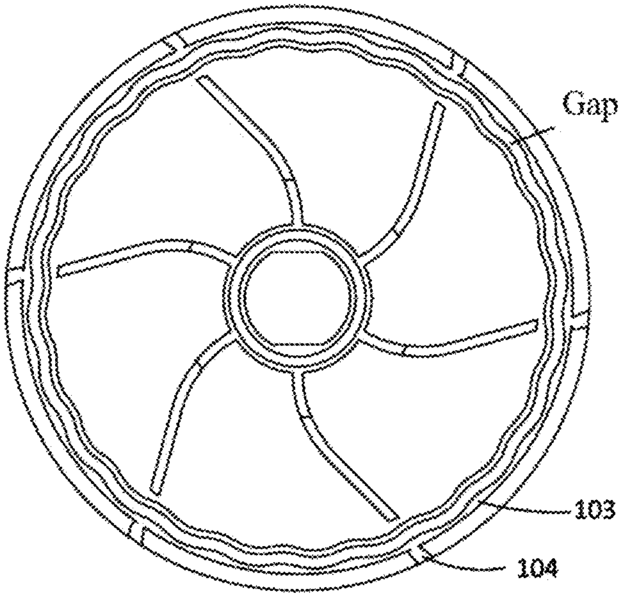
FIG. 4*b* is another cross sectional view of the impeller assembly according to the embodiment of the present disclosure.

FIG. 4*a* is a schematic diagram of an impeller assembly 10 provided by the embodiment of the present disclosure. Referring to FIG. 4*a*, the difference of the impeller assembly 10 from the impeller assembly shown in FIG. 3*a* is that the impeller body 101 can be truncated cone-shaped, so that the mixing of powder and liquid can be performed at an upper portion of the truncated cone-shaped body. The suspension formed by the powder and the liquid is driven by the mixing blades 102 to be continuously accelerated in the downward flowing process and finally reaches a dispersion area to be subjected to strong shear dispersion, so that wetting and dispersion of powder are facilitated. The gap shown in FIG. 4*b* is consistent with the gap in the embodiment shown in FIG. 3*b*.

Figure 4C:
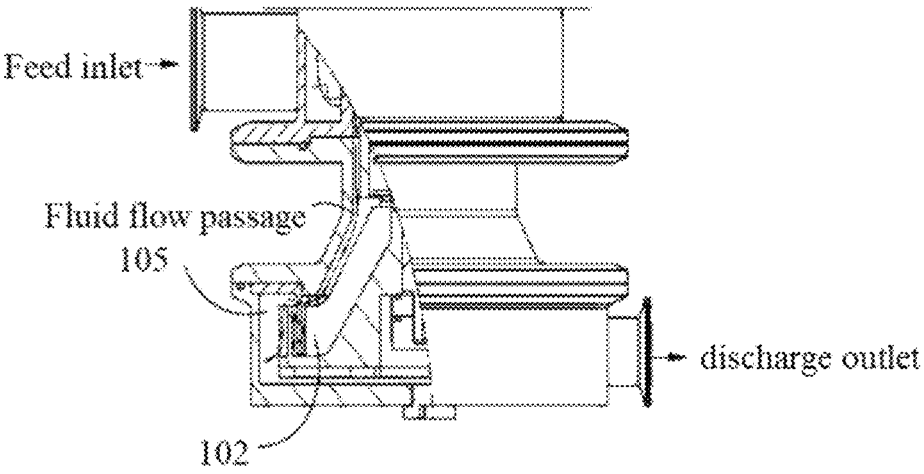
FIG. 4*c* is a schematic diagram of a bent flow passage of a mixing device according to an embodiment of the present disclosure.

Referring to a relative position of the impeller body 101 in the mixing device in FIG. 4*c*, gaps are between top ends of the baffle plates 103 and the corresponding surfaces of the cavity 105 or the impeller body 101, and the gaps at the top ends of the baffle plates 103 and a gap between the adjacent baffle plate 103 jointly form a bent passage configured for a suspension to flow from the inner side of the impeller body 101 to the outer side of the impeller body 101. The suspension is subjected to a strong shear effect when flowing in the bent passage. After passing through the bent flow passage, the suspension reaches a space defined by the outer baffle plate and the cavity, and is discharged under the action of the discharging blades 104.

Optionally, in order to ensure that the suspension can smoothly pass through the multiple baffle plates 103, the sizes of the gaps between the top ends of the baffle plates 103 and the corresponding surface of the cavity 105 or the impeller body 101 are 1-10 mm.

In other embodiments, multiple through holes or through grooves 1032 are formed in the surfaces of each of the inner and outer baffle plates. The through holes or through grooves 1032, the gaps between top ends of the baffle plates 103 and corresponding surfaces of the cavity 105 or the impeller body 101 and the gaps between the adjacent baffle plates 103 form a bent passage configured for a suspension to flow from the inner side of the impeller body 101 to the outer side of the impeller body 101. The larger the diameters of the through holes 1032 or the widths of the through grooves 1032, the easier the suspension passes through the multiple baffle plates, and the less the average retention time in the curved passage, thereby resulting in reduction of the dispersion effect. So, preferably, the diameter of each of the through holes 1032 or the width of each of the through grooves 1032 is 1-5 mm in order to achieve the dispersion effect while increasing the flow rate of the suspension.

Figure 5A:
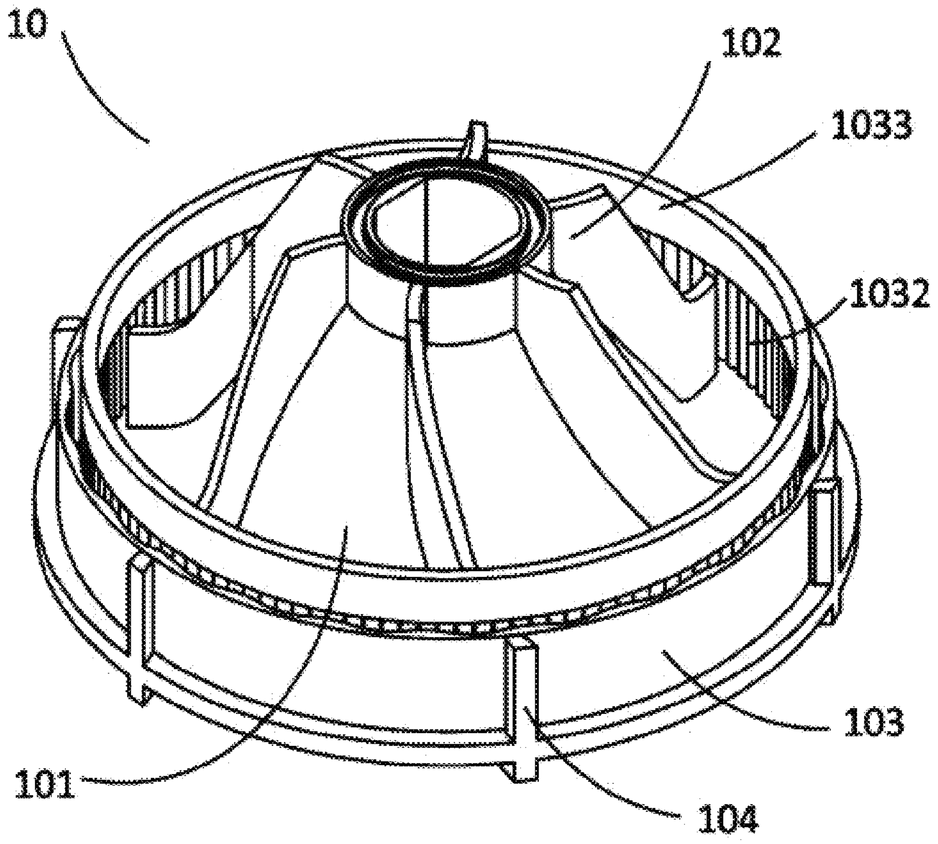
FIG. 5*a* is yet another schematic diagram of an impeller assembly according to an embodiment of the present disclosure.

FIG. 5*a* is another schematic diagram of the impeller assembly 10 provided by the present disclosure. Inner and outer baffle plates 103 are disposed on the outer side of the impeller body 101 along the radial direction of the impeller body 101 outwards and disposed in the circumferential direction of the impeller body 101. An inner surface of the outer baffle plate is provided with a corrugated structure 1031 which fluctuate periodically along the circumferential direction of the outer baffle plate. The outer baffle plate is fixedly connected with the impeller body 101. Referring to FIG. 5*a*, the heights of the through grooves 1032 in the surface of the inner baffle plate are close to the height of the outer baffle plate, and the inner baffle plate is disposed so that the cross sections of the inner baffle plate at most heights thereof are discontinuous curves formed by arranging circles at predetermined intervals. In this way, the corresponding curve on the cross section of the surface of the inner baffle plate is a discontinuous smooth curve. The baffle structure in the present embodiment can be understood to be a comb-shaped structure formed by arranging multiple identical cylinders at predetermined intervals, and the interval between cylinders of the comb-shaped structure is 1-5 mm. It should be understood that a surface of the comb-shaped structure is smooth, so that the speed loss is small when the suspension passes through the structure. The flow passage of the suspension is increased through the arrangement, so that the suspension passes through the inner baffle plate more smoothly, and the flow rate is improved. And the structure can guide the fluid to change the speed direction thereof evenly without forming vortexes or "dead zones", and a good dispersion effect can still be maintained. It should be noted that an upper end of the inner baffle plate is a flange 1033, which is slightly higher than the outer baffle plate and is fixedly connected to the cavity 105 of the mixing device. Optionally, when the longitudinal heights of the through grooves 1032 are close to or even reach the heights of the whole baffle plates 103, the cross sections of the baffle plates 103 at most height thereof can be of comb-shaped structures formed by arranging multiple cylinders in the shape defined by ellipses or other closed smooth curves at predetermined intervals. The typical comb-shaped structures formed by an elliptic cylinder, a cone and the like are within the protection range of the present disclosure, as long as the smooth surfaces of the cylinders are guaranteed. Of course, the comb-shaped structure of the inner baffle plate can be fixedly connected with the impeller body 101, the outer baffle plate is fixedly connected with the cavity, and the inner baffle plate can be fixedly connected without the flange 1033.

Figure 5B:
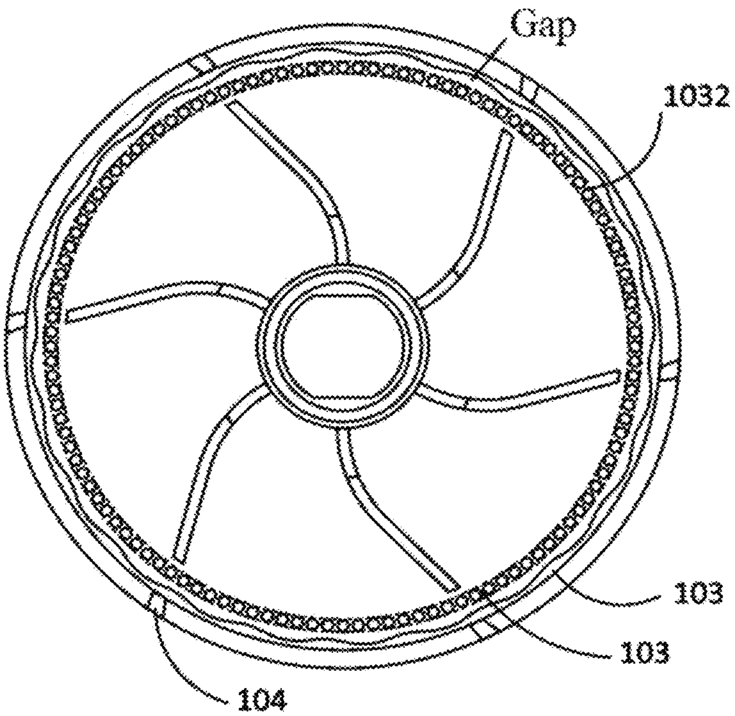
FIG. 5*b* is yet another cross sectional view of the impeller assembly according to the embodiment of the present disclosure.

It should be noted that the embodiment shown in FIG. 5*a* and FIG. 5*b* is not limited to the fact that the inner baffle plate must be the comb-shaped structure. The inner and outer baffle plates are only described with respect to the impeller body. Alternative embodiments may be provided in which the surface of the inner baffle plate is of a corrugated structure 1031, and the surface of the outer baffle surface is of a comb-shaped structure.

Figure 6A:
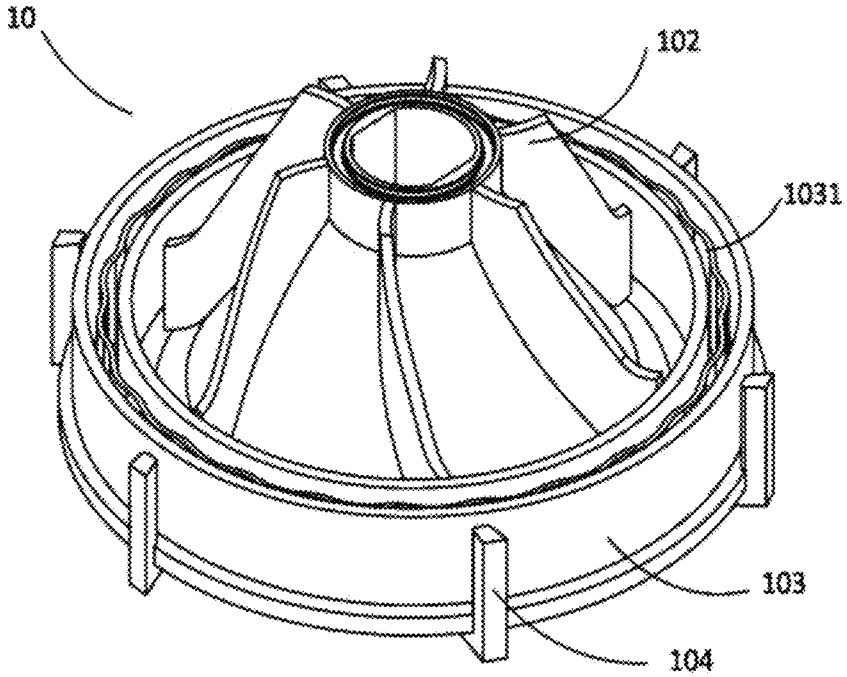
FIG. 6*a* is yet another schematic diagram of an impeller assembly according to an embodiment of the present disclosure.
Figure 6B:
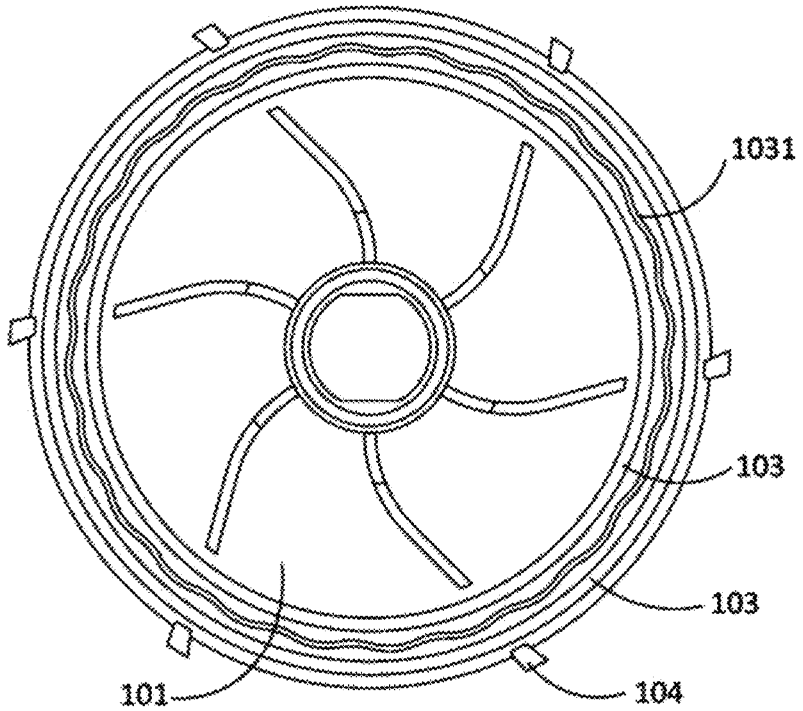
FIG. 6*b* is yet another cross sectional view of the impeller assembly according to the embodiment of the present disclosure.

Besides the impeller assembly of the two baffle plates described above, in other embodiments, in the impeller assembly 10 provided in the present disclosure, more baffle plates are sequentially arranged in sequence on the outer side of the impeller body 101 along the radial direction of the impeller body 101 outwards and arranged in the circumferential direction of the impeller body 101. Referring to FIG. 6*a*, inner, middle and outer baffle plates are sequentially arranged on the outer side of the impeller body 101 along the radial direction of the impeller body 101 outwards and arranged in the circumferential direction of the impeller body 101. Where, the inner baffle plate and the outer baffle plate are fixedly connected with the cavity 105 of the mixing device and have smooth surfaces. The inner surface and the outer surface of the middle baffle plate are both provided with corrugated structures 1031 periodically fluctuating along the circumferential direction of the middle baffle plate. And the middle baffle plate is fixedly connected with the impeller body 101 and rotates synchronously with the impeller body 101. Gaps defined between the middle baffle plate and the inner baffle plate and between the middle baffle plate and the outer baffle plate are as shown in FIG. 6*b*. Obviously, the gap between the surface of the corrugated structure 1031 and the smooth surface is continuously and uniformly changed, so that the minimum gap can be kept to be small to maintain high shear strength. Gaps are formed between the inner surface of the middle baffle plate and the inner baffle plate and between the outer surface of the middle baffle plate and the outer baffle plate, so that the volume of the dispersion area between the baffle plates 103 is remarkably increased to ensure enough retention time, and a good dispersion effect is obtained. Preferably, the size of the minimum gap is 1-5 mm. When the gap between the two adjacent baffle plates 103 becomes smaller smoothly, the speed of the suspension in the flow passage is continuously changed, and the static pressure is continuously changed. When the static pressure is instantly reduced to be low enough, cavitation is caused, multiple microbubbles are generated, and strong impact is caused to particle agglomerates in the suspension, so that the dispersion effect is improved. It should be understood that when both the outer surface of the inner baffle plate and the inner surface of the outer baffle plate are provided with or partially provided with corrugated structures 1031, the effect described above is still achieved.

Figure 7A:
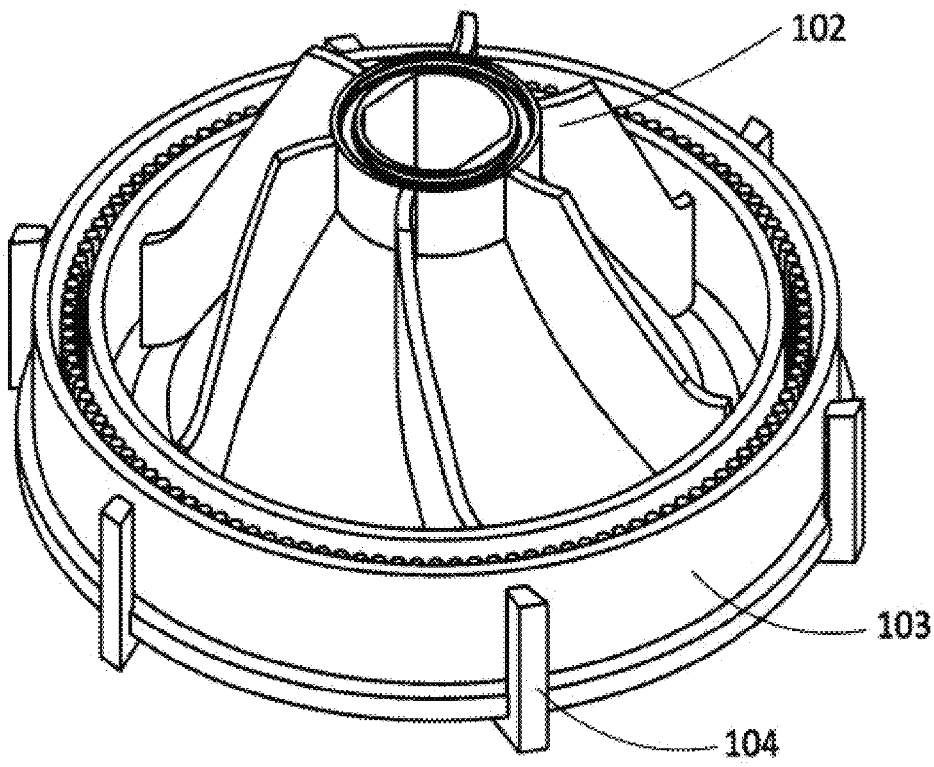
FIG. 7*a* is yet another schematic diagram of an impeller assembly according to an embodiment of the present disclosure.
Figure 7B:
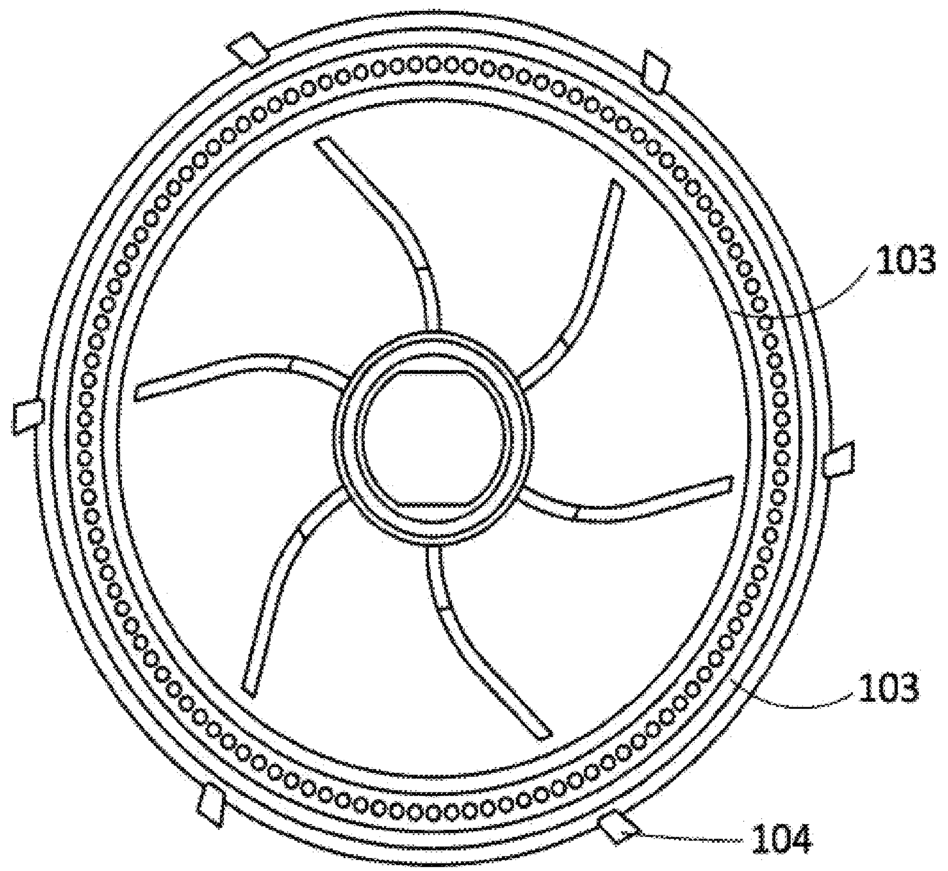
FIG. 7*b* is yet another cross sectional view of the impeller assembly according to the embodiment of the present disclosure.

FIG. 7*a* is a schematic diagram of an impeller assembly 10 provided by an embodiment of the present disclosure. Referring to FIG. 7*a*, the difference from the embodiment as shown in FIG. 6*a* is that the middle baffle plate is the same as the inner baffle plate in the embodiment as shown in FIG. 5*a* and FIG. 5*b*. The inner and outer baffle plates are fixedly connected to the cavity 105 of the mixing device to remain stationary, and the middle baffle plate is fixedly connected to the impeller body and rotates synchronously with the impeller body, so that flow passages of the suspension is increased. FIG. 7*b* shows a flow passage of the suspension formed by the gaps among the three baffle plates in the embodiment, so that the gap between every two adjacent baffle plates is uniformly and continuously changed, the minimum gap can be kept minimum to maintain high shear strength, and the volume of the dispersion area can be significantly increased to ensure enough residence time, thereby obtaining a good dispersion effect. Moreover, the continuously changed width of the flow passage can also cause cavitation as well, multiple microbubbles are generated, and strong impact is caused to particle agglomerates in the suspension, so that the dispersion effect is improved.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An impeller assembly for a solid-liquid mixing device, the impeller assembly comprising an impeller body, a plurality of mixing blades which are evenly distributed being located on an inner side of the impeller body and extended outwards from a shaft of the impeller body, and at least two baffle plates being disposed on an outer side of the impeller body along a radial direction of the impeller body outwards and disposed in a circumferential direction of the impeller body, wherein one of every adjacent two baffle plates is fixedly connected to a cavity of the mixing device, an other of the every adjacent two baffle plates is fixedly connected to the impeller body, and at least one pair of adjacent two baffle plates satisfies following conditions: curves projected by two opposite surfaces of each of adjacent baffle plates on a cross section of the impeller at any height are smooth curves, and at least one of the curves is not fully included in a circle with a center of the shaft as its center; wherein the curves corresponding to the two opposite surfaces of the adjacent baffle plates on the cross section at any height are of corrugated structures which fluctuate periodically along the circumferential direction of the impeller body;

a minimum size of the gap between the every adjacent two baffle plates is 1-5 mm;

gaps between top ends of the baffle plates and corresponding surfaces of the cavity or the impeller body, and a gap between every adjacent two baffle plates form a bent passage configured for a suspension to flow from the inner side of the impeller body to the outer side of the impeller body; and a plurality of through holes or a plurality of through grooves are formed in baffle plates, and the through holes or through grooves, the gaps at the top ends of the baffle plates and the gap between the every adjacent two baffle plates form a bent passage configured for a suspension to flow from the inner side of the impeller body to the outer side of the impeller body.

2. The impeller assembly according to claim 1, wherein sizes of the gaps at the top ends of the baffle plates are 1-10 mm.

3. The impeller assembly according to claim 2, wherein a diameter of each of the through holes or a width of each of the through grooves in the baffle plates is 1-5 mm.

4. The impeller assembly according to claim 3, wherein a cross section of at least one of the adjacent baffle plates at a predetermined height thereof is of a structure formed by arranging a plurality of circles, ellipses or other closed smooth curves along the circumferential direction of the impeller body at predetermined intervals.

5. The impeller assembly according to claim 4, further comprising a plurality of discharging blades disposed on an outer side of an outermost one of the baffle plates substantially along the radial direction of the impeller body, and the plurality of discharging blades are fixedly connected with the impeller body and rotate synchronously with the impeller body.

6. A solid-liquid mixing device, comprising the impeller assembly according to claim 2.

7. A solid-liquid mixing device, comprising the impeller assembly according to claim 1.

* * * * *